United States Patent
Dallago

[11] Patent Number: 6,154,341
[45] Date of Patent: Nov. 28, 2000

[54] SYSTEM AND METHOD FOR ACCESSING AND CLEANING A RECORDING SYSTEM

[75] Inventor: Anthony P. Dallago, Chandler, Ariz.

[73] Assignee: Storage Technology Corporation, Louisville, Colo.

[21] Appl. No.: 09/384,805

[22] Filed: Aug. 27, 1999

Related U.S. Application Data

[63] Continuation of application No. 09/056,970, Apr. 8, 1998, Pat. No. 6,021,026.

[51] Int. Cl.$^7$ ............................................. G11B 5/41
[52] U.S. Cl. ............................................. 360/128
[58] Field of Search ............................................. 360/128, 137

[56] References Cited

U.S. PATENT DOCUMENTS

| | | |
|---|---|---|
| 3,881,195 | 4/1975 | Ono et al. . |
| 3,955,214 | 5/1976 | Post et al. ............................. 360/128 |
| 4,272,796 | 6/1981 | Kreuningen et al. ................. 360/128 |
| 4,445,158 | 4/1984 | Clausen et al. ....................... 360/137 |
| 4,458,281 | 7/1984 | Kara . |
| 4,631,614 | 12/1986 | Davis et al. . |
| 4,631,616 | 12/1986 | Zago et al. . |
| 4,669,017 | 5/1987 | Blank et al. ........................... 360/128 |
| 4,698,712 | 10/1987 | Fritsch . |
| 4,716,485 | 12/1987 | Yeung . |
| 4,751,600 | 6/1988 | Cecil et al. ........................... 360/128 |
| 4,763,216 | 8/1988 | Solhjell et al. . |
| 4,775,910 | 10/1988 | Rudi ...................................... 360/128 |
| 4,825,319 | 4/1989 | Andreas . |
| 4,843,508 | 6/1989 | Mannheimer et al. . |
| 4,918,557 | 4/1990 | Lee . |
| 5,021,911 | 6/1991 | Kingsbury . |
| 5,128,923 | 7/1992 | Hasegawa et al. . |
| 5,309,307 | 5/1994 | Fritsch et al. . |
| 5,355,269 | 10/1994 | Clausen . |
| 5,671,108 | 9/1997 | Clausen . |
| 5,710,684 | 1/1998 | Inoue et al. . |
| 5,729,398 | 3/1998 | Nouchi et al. . |

FOREIGN PATENT DOCUMENTS

| | | |
|---|---|---|
| 0 102 897 | 3/1984 | European Pat. Off. . |
| 0 439 375 | 7/1991 | European Pat. Off. . |
| 0 800 162 | 10/1997 | European Pat. Off. . |
| 59-154626 | 9/1984 | Japan . |
| 2-50312 | 2/1990 | Japan . |
| 4-129074 | 4/1992 | Japan . |
| 6-020295 | 1/1994 | Japan . |
| 7-021577 | 1/1995 | Japan . |
| 7-201062 | 8/1995 | Japan . |

Primary Examiner—William Klimowicz
Attorney, Agent, or Firm—Wayne P. Bailey; Brooks & Kushman, P.C.

[57] ABSTRACT

A cartridge for cleaning recording heads in a tape deck uses rotating brushes with a sweeping motion perpendicular to the direction in which tape travels over the recording heads. The brushes are connected through a gear train to the tape deck driving hub. The brushes and other elements are conductive, grounding static electricity generated by the cleaning operation.

5 Claims, 4 Drawing Sheets

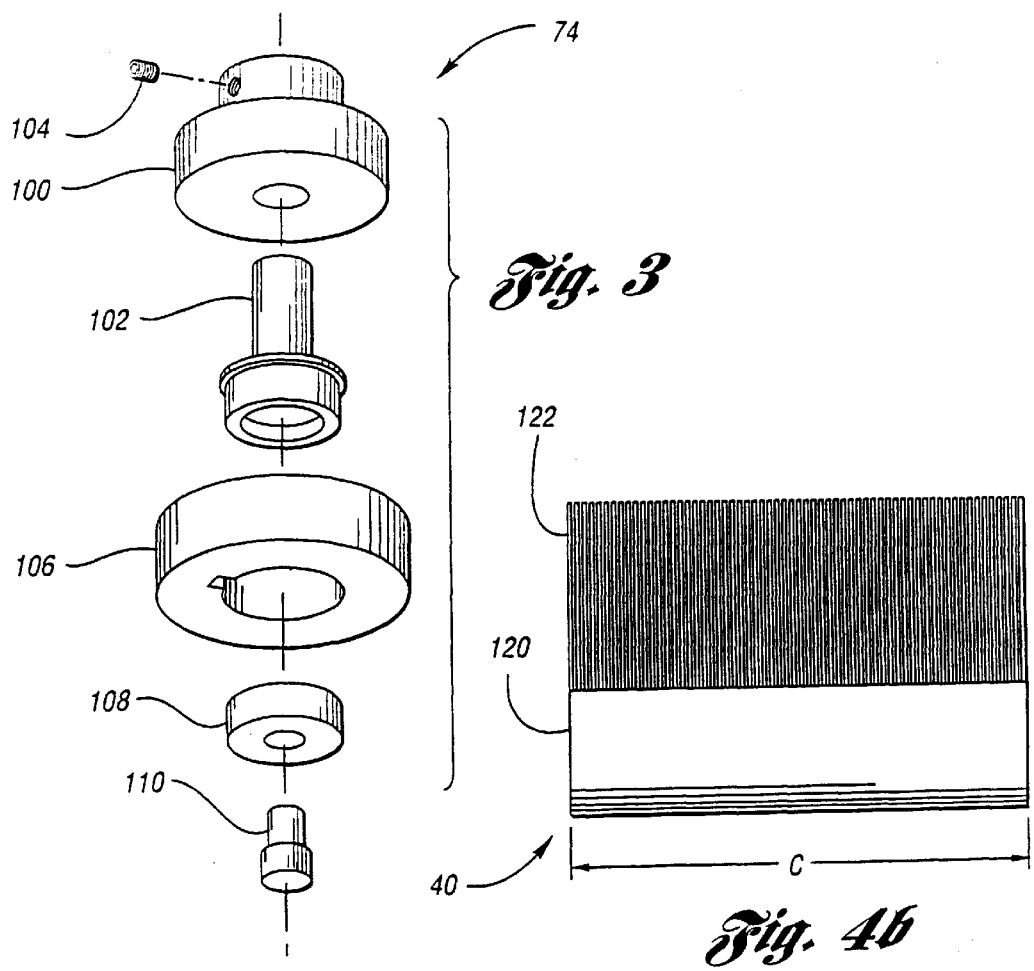
*Fig. 3*
*Fig. 4b*
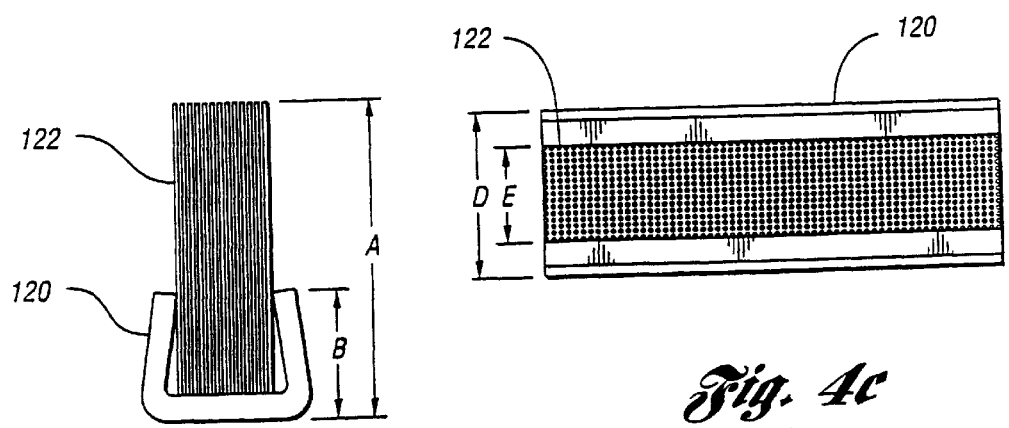
*Fig. 4a*
*Fig. 4c*

SYSTEM AND METHOD FOR ACCESSING AND CLEANING A RECORDING SYSTEM

This is a continuation of application Ser. No. 09/056,970 filed on Apr. 8, 1998, now U.S. Pat. No. 6,021,026.

TECHNICAL FIELD

The present invention relates to cartridges used to clean magnetic tape heads.

BACKGROUND ART

Tape systems allow large amounts of data to be stored in a cost effective manner. Tape systems include tape cartridges, which hold tape coated with a magnetic medium, and tape decks, which contain electronics capable of writing to and reading from the magnetic tape.

Over time, heads in the tape deck responsible for writing to and reading from the tape become covered with contaminants. One source of contaminants is from the tape itself. Tape may include a substrate, back coat oxide, metal particles, mylar film, and a binder. These materials decay from the tape structure during operation and storage of the tape and form debris. During drive operation, debris migrates to areas on the tape path and transport. In particular, debris deposits onto the surface of the magnetic recording head and in the air bleed slots of the head. As debris deposits build, the tape may "fly" above read/write elements, compromising tape deck operation.

Another source of contamination on magnetic recording heads comes from "brown stains". Brown stain is thought to arise from tape decay during storage in combination with other variables. Brown stain may also cause the tape to fly above read/write elements, compromising data exchange.

As tape deck technology advances, mechanisms for cleaning tape heads must also improve. One advance in tape deck technology is the use of a high density recording dual read/write head. This head employs bleed slots perpendicular to the direction of tape travel to ensure a proper read/write interface between the head and the tape. Another advance is increased use of microelectronics. Microelectronic devices can be easily damaged by static electricity generated during cleaning operations.

Various cleaners in cartridge and cassette housings have been proposed. In particular, U.S. Pat. Nos. 4,458,281 to Kara and 4,918,557 to Lee describe devices for cleaning audio cassette player heads using a linear wiping motion in the same direction as tape travel. Such motion may cause the same grooving as cleaning tapes and, hence, is not an acceptable solution. Movement in the direction of tape travel will not adequately clean head bleed slots perpendicular to the direction of tape travel. Also, no ability to prevent or remove static electricity build-up is described.

U.S. Pat. No. 4,631,616 to Zago et al. describes an audio cassette player head cleaner. In this device, a cleaning pad is rotated such that the cleaning motion is substantially the same as tape movement over the head. Again, this may cause a buildup of debris in vertical bleed slots detrimental to tape head operation. Also, motion is not conducive to cleaning head bleed slots and static electricity build-up is not addressed.

U.S. Pat. Nos. 4,716,485 to Yeung and 4,825,319 to Andreas also describe audio cassette player head cleaners. In each of these patents, a circular cleaning pad is rotated such that a point on the face of the pad traces a circle on the head. A first difficulty with these devices is that the effective speeds of cleaning elements at different radial locations from the center of the pad will cause different cleaning effectiveness, with the center element having virtually no cleaning effect. A second difficulty is that cleaning pads will not produce enough scrubbing action to remove brown stain. A third difficulty is an inability to effectively clean head bleed slots. A fourth difficulty is static electricity build-up.

U.S. Pat. No. 4,631,614 to Davis et al. describes a device for cleaning computer heads. The device uses a cam action to drive a cleaning pad in an oscillating vertical stroke. The use of a cleaning pad and the cam mechanism will not produce enough scrubbing action to remove brown stain. Also static electrical build-up may occur.

What is needed is a device for mechanically cleaning a magnetic recording head. The device should scrub the head uniformly to prevent uneven wearing. The device must also remove debris from head bleed slots. Furthermore, a means must be provided to remove any static electricity that may result from cleaning to prevent damage to tape deck electronics.

SUMMARY OF THE INVENTION

It is an object of the present invention to provide a device that can be inserted into a tape deck for the purpose of cleaning a magnetic recording head.

Another object of the present invention is to clean a recording head in a uniform manner.

Still another object of the present invention is to remove brown stain and decaying tape debris from a recording head.

Yet another object of the present invention is to clean bleed slots in the recording head that run perpendicular to the tape direction.

A further object of the present invention is to provide a cost effective means of cleaning recording heads.

A still further object of the present invention is to use existing cartridge shell designs to implement a recording head cleaning device.

Yet a further object of the present invention is to properly ground cleaning elements and drive mechanisms such that static electricity cannot build up and damage electronics within the tape deck.

In carrying out the above objects and other objects and features of the present invention, a cartridge for cleaning a recording head in a tape deck is presented. The recording head can read from or write to tape moving across the recording head in a tape direction. The tape deck has a driving hub for advancing the tape. The cartridge includes a housing and a driven hub within the housing for rotatively coupling to the driving hub. At least one brush assembly is rotatively mounted within the housing, each brush assembly having at least one brush, and each brush assembly rotating about an axis parallel to the tape direction. A means within the housing transfers rotation from the driven hub to each brush assembly. If the cartridge is inserted in the tape deck and the driving hub is rotated, each brush is periodically rotated into contact with the recording head with a sweeping movement perpendicular to the tape direction.

In one embodiment of the present invention, each rotating brush assembly and the means for transferring rotation are operable to transfer static electricity away from the recording head.

In another embodiment of the present invention, there are two rotating brush assemblies, a first rotating brush assembly and a second rotating brush assembly, the second brush assembly is located above the first rotating brush assembly and is operative to rotate in an opposite direction than the first rotating brush assembly.

In still another embodiment of the present invention, each brush assembly includes a brush, a shaft about which the brush rotates, and a means for attaching the brush to the shaft. In yet another embodiment, the brush includes a housing channel attached to the means for attaching the brush to the shaft and a plurality of filaments attached to the housing channel so as to extend generally radially from the shaft. In a further embodiment, the filaments are nylon with carbon suffused into the surface.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is an exploded view of an embodiment of a spur and helical gear combination for use in the present invention; and FIGS. 4a through 4c are views of an embodiment of a brush for use in the present invention.

BEST MODES FOR CARRYING OUT THE INVENTION

Figure 1A:
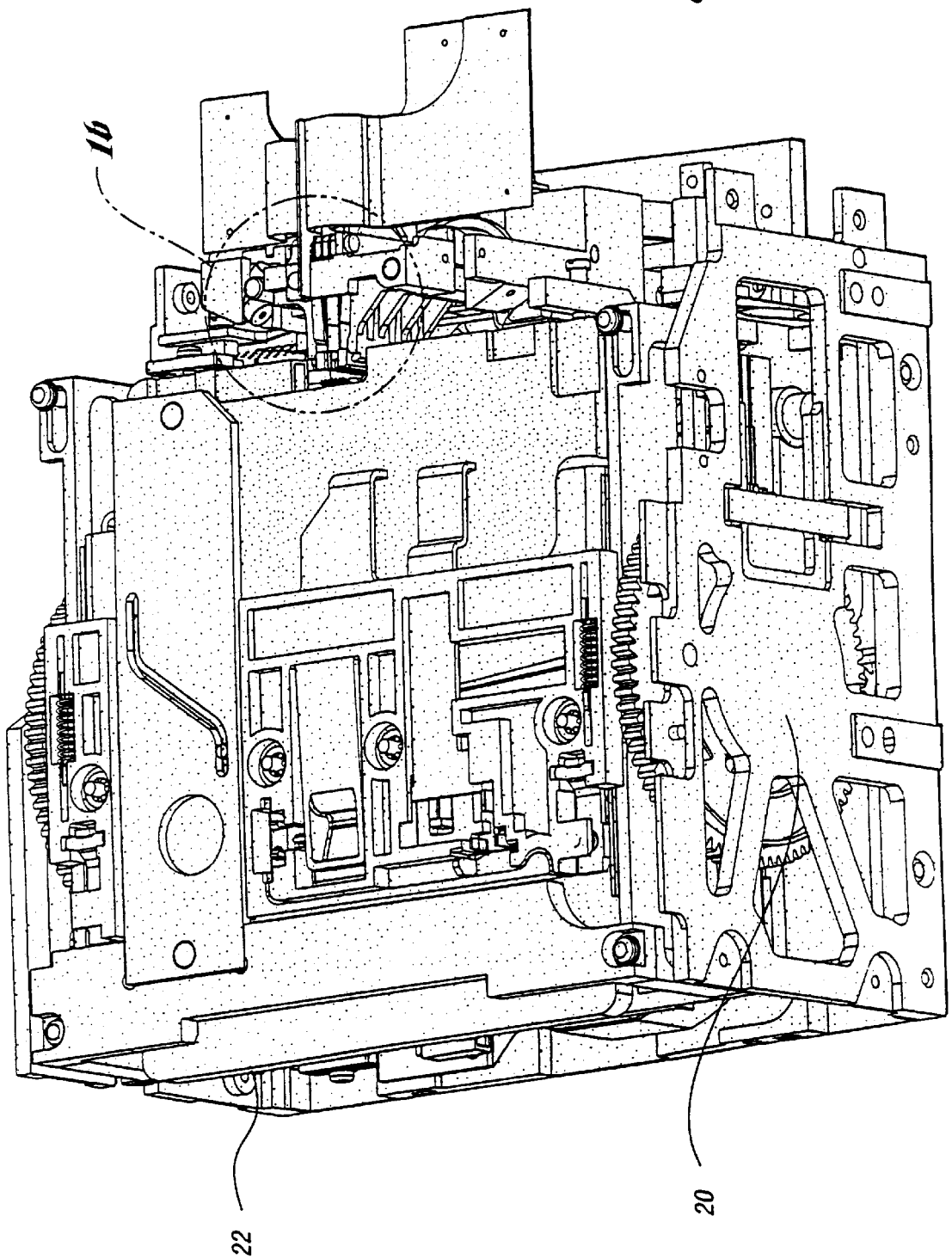
FIG. 1a is a perspective view of a loader mechanism with a cleaning cartridge according to the present invention.

Referring now to FIG. 1a, a perspective view of a loader mechanism with a cleaning cartridge according to the present invention is shown. Loader mechanism 20 is part of a tape deck, the remainder of which has not been shown for clarity. Loader mechanism 20 accepts tape cartridges for recording and playback. Cleaning cartridge 22 is shown fully inserted into loader mechanism 20. Loader mechanism 20 is operative to allow cleaning cartridge 22 to come into contact with elements of the tape deck requiring cleaning.

Figure 1B:
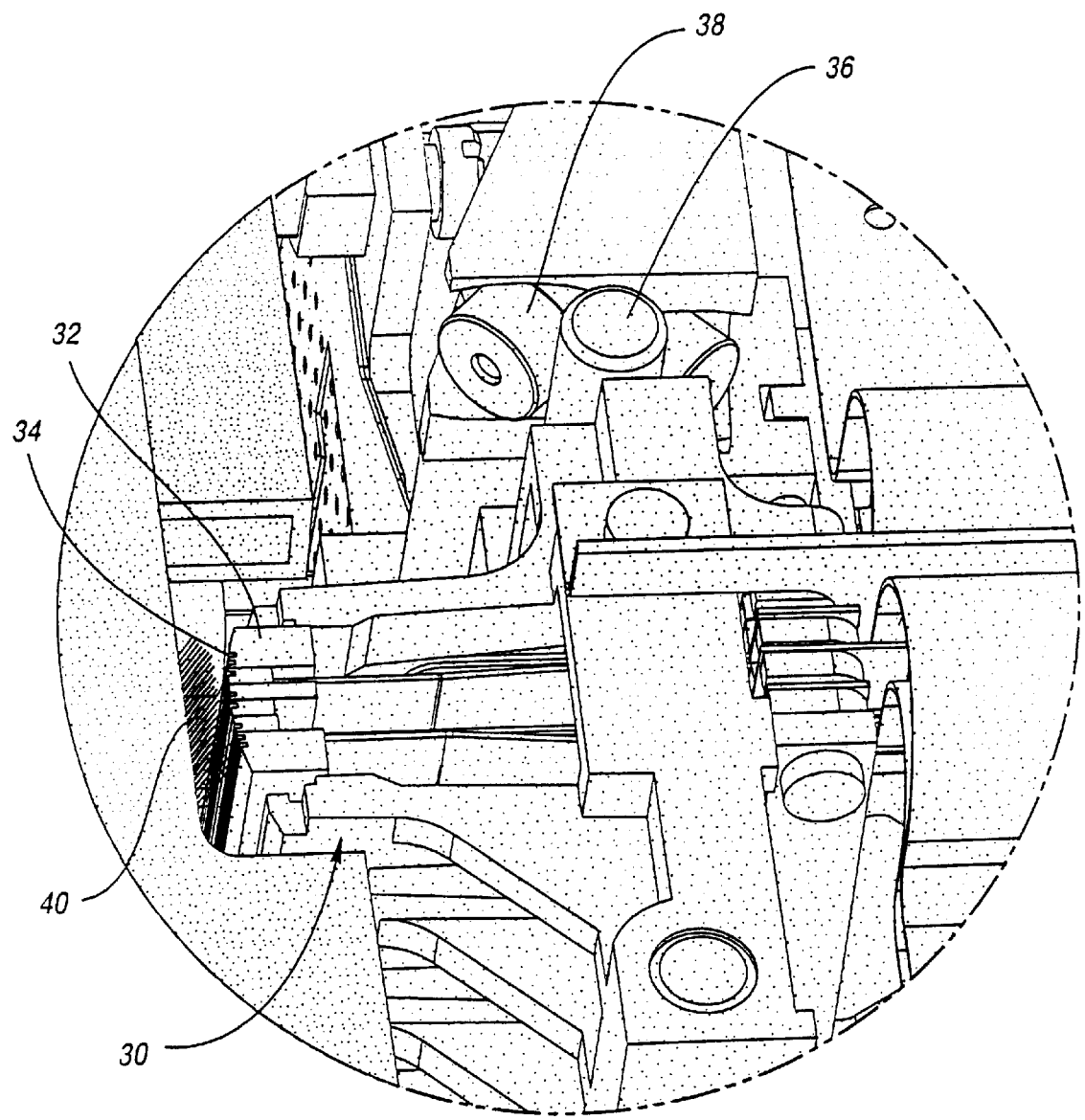
FIG. 1b is a detailed view of the loader mechanism of FIG. 1a illustrating the recording head assembly area.

Referring now to FIG. 1b, a detailed view of the loader mechanism of FIG. 1a illustrating the recording head assembly area is shown. Recording head assembly 30 includes recording head 32 operative to write to and read from magnetic tape not shown. The tape is moved across recording head 32 horizontally. Recording head 32 may include one or more bleed slots, one of which is shown by 34. Recording head assembly 30 includes two carriage pins, one of which is indicated by 36. Each carriage pin 36 slides on ball bearings 38 allowing recording head assembly 30 to move vertically for the purpose of reading and writing as well as for cleaning.

When cleaning cartridge 22 is inserted into loader mechanism 20 and a driving hub in the tape deck is rotated, brush 40 rotates about an axis parallel to tape travel, giving brush 40 a vertical stroke against recording head 32. This scrubbing action removes debris and brown stain from recording head 32 as well as cleans debris from bleed slot 34. Cleaning action is improved by vertically oscillating recording head assembly 30 while rotating brush 40. Static electricity that may be generated through the cleaning action of brush 40 is dissipated through conductive elements in brush 40, through cleaning cartridge 22, into loader mechanism 20 and to ground. Details of the design and operation of cleaning cartridge 22 will be further described with regards to FIGS. 2 through 4 below.

Figure 2:
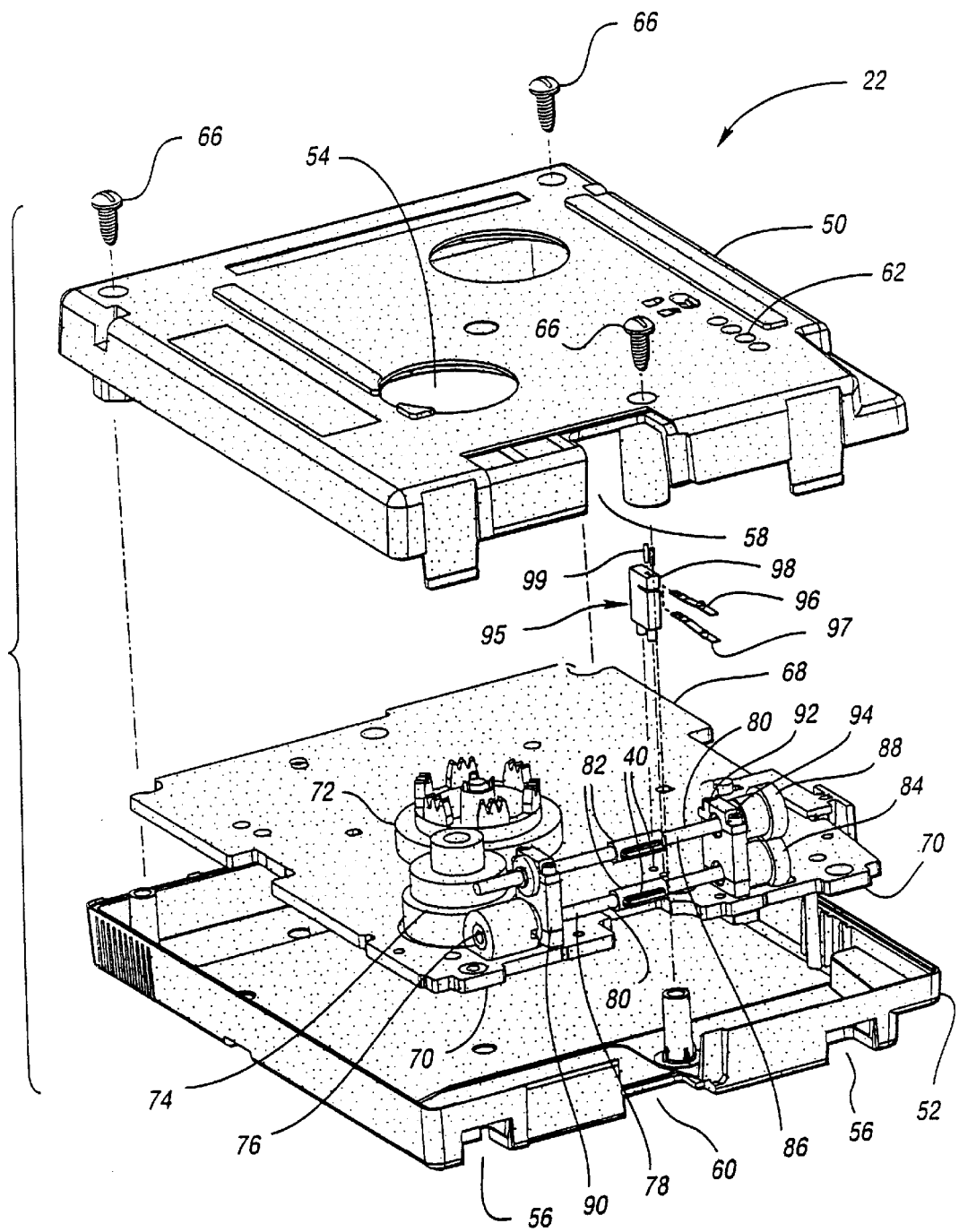
FIG. 2 is an exploded perspective view of an embodiment of a cleaning cartridge according to the present invention.

Referring now to FIG. 2, an exploded perspective view of an embodiment of a cleaning cartridge according to the present invention is shown. Cleaning cartridge 22 includes top shell 50 and bottom shell 52. When assembled, top shell 50 and bottom shell 52 from a housing for cleaning cartridge. In a preferred embodiment, top shell 50 and bottom shell 52 are similar to a standard 3480 form factor tape cartridge top and bottom shells. Top shell 50 includes hub opening 54 through which a hub driven by a reel motor in loader mechanism 20 can transfer rotational motion. Bottom shell 52 includes two ground slots 56 through which static electricity may be transferred to loader mechanism 20 as will be described below. Top brush opening in the front of top shell 50 and bottom brush opening in the front of bottom shell 52 allow one or more of brush 40 to contact recording head 32. Top shell 50 may also include cartridge identification marks 62 that can be read by sensors in loader mechanism 20 to identify cleaning cartridge 22. When assembled, top shell 50 and bottom shell 52 are held together with three of shell fastener 66, preferably plastic.

Within cleaning cartridge 22, plate 68 is a support for the means used to rotate one or more of brush 40. Plate 68 includes ground tabs 70 which protrude through corresponding ground slots 56. When inserted into the tape deck, ground tabs 70 contact a grounded region on loader mechanism 20 to conduct static electricity away from recording head 32 to ground. In a preferred embodiment, plate 68 is constructed of a conductive metal such as, for example, aluminum.

A means for rotating two of brush 40 will now be described. Hub/spur gear assembly 72 is rotatively mounted to plate 68 so as to be concentrically aligned with hub opening 54. Hub/spur gear assembly 72 is operative to couple with the corresponding driving hub in loader mechanism 20 such that, when the driving hub rotates, hub/spur gear assembly 72 is rotatively driven. In a preferred embodiment, hub/spur gear assembly 72 is molded as a single piece. In an alternate embodiment, a hub can be staked, glued, or press fit onto a spur gear.

Spur/helical gear assembly 74 is rotatively mounted on plate 68 so that a spur gear portion of spur/helical gear assembly 74 couples with a spur gear portion of hub/spur gear assembly 62. Spur/helical gear assembly 74 is further discussed with regards to FIG. 3 below.

A helical gear portion of spur/helical gear assembly 74 couples to helical gear 76. Helical gear 76 has an axis of rotation orthogonal to the axis of rotation of spur/helical gear assembly 74 and essentially parallel to the front of cleaning cartridge 22. Helical gear 76 may be constructed of metal or, preferably, an engineering plastic.

One end of lower brush assembly 78 is attached to helical gear 76 so as to rotate brush assembly 78 about the same axis of rotation as helical gear 76. In a preferred embodiment, brush assembly 78 includes shaft 80, brush holder 82, and brush 40. Shaft 80 is preferably 300 or 400 series stainless steel. Brush holder 82 is operative to attach brush 40 to shaft 80. In a preferred embodiment, brush 40 is insert molded into brush holder 82. Brush holder is press fit onto a raised radial step formed on shaft 80. Alternatively, brush 40 may be directly bonded to shaft 80, omitting the need for brush holder 82. The end of lower brush assembly 78 opposite of helical gear 76 is attached to lower spur gear 84.

One end of upper brush assembly 86 is attached to upper spur gear 88. Upper spur gear 88 is coupled to lower spur gear 84 so as to rotate upper brush assembly 86 about an axis parallel to the axis of rotation of lower brush assembly 78. Upper brush assembly 86 has the same construction as lower brush assembly 78. Lower spur gear 84 and upper spur gear 88 are preferably constructed of an engineering plastic.

Upper brush assembly 86 and lower brush assembly 78 are retained by two of standoff assembly 90, one near each end of upper brush assembly 86 and lower brush assembly 78. Bushings in standoff assembly 90, one of which is indicated by 92, allow shaft 80 in either brush assembly 78 or 86 to freely rotate. Bushing 92 is preferably constructed of an engineering polymer. Each of standoff assembly 90 is attached to plate 68 using two of standoff fastener 94.

Referring again to FIG. 2, means for transmitting static electricity will be described. In both lower brush assembly 78 and upper brush assembly 86, brush 40, shaft 80, and the means for attaching brush 40 to shaft 80 such as, for example, brush holder 82, conduct static electricity.

In a preferred embodiment, grounding assembly, shown generally at 95, provides a path between brush assemblies 78, 86 and plate 68. Top load spring 96 and bottom load spring 97, made from a conductive material such as spring brass or stainless steel, are pressed into load spring holder 98, also made from a conductive material. Load spring holder is pressed into corresponding openings in plate 68 so that top load spring 96 is lightly loaded against shaft 80 of upper brush assembly 86 and so that bottom load spring 97 is lightly loaded against shaft 80 of lower brush assembly 78. Two of roll pin 99 are pressed into load spring holder 98 and fit into corresponding openings in top shell 50 when cleaning cartridge 22 is assembled.

In an alternate embodiment, grounding assembly 95 is not present. Instead, standoff assembly 90 and bushings 92 are constructed of conductive material and, hence, are operative to conduct static electricity from brush assemblies 78, 86 to plate 68 then through ground tabs 70 to ground.

In still another alternate embodiment, lower spur gear 84, upper spur gear 88, helical gear 76, and elements of spur/helical gear assembly 74 are constructed of conductive material and form a path for static electricity from brush assemblies 78, 86 to plate 68.

In a preferred embodiment, gear ratios in the means for rotating brush 40 allow brush 40 to rotate at speeds up to 7000 RPM.

Referring now to FIG. 3, and exploded view of an embodiment of a spur and helical gear combination for use in the present invention is shown. In one embodiment, plastic spur gear 100 is slid onto metal gear shaft top 102 and held in place by set screw 104. Gear shaft top 102 is then press fit into the top of plastic helical gear 106. Ball bearing 108 is press fit into the bottom of helical gear 106. Steel bottom shaft 110 slides into ball bearing 108 and is pressed into a corresponding hole in plate 68.

In a preferred embodiment, spur gear 100, gear shaft top 102, and helical gear 106 are formed as one piece of engineering polymer. In this case, set screw 104 is not required.

Referring now to FIGS. 4a through 4c, views of an embodiment of a brush for use in the present invention are shown. Brush 40 is comprised of housing channel 120 and filaments 122. Filaments 122 are constructed of a conductive polymer such as, for example, nylon with carbon suffused into the surface. Filaments may range from 0.0021 inches (0.055 mm) to 0.0034 inches (0.085 mm) in diameter.

Housing channel 120 is constructed of a conductive metal such as, for example, a 3003 aluminum sheet with a 28 gauge thickness. Filaments 80 are crimped and glued into housing channel 120 in a manner such that, when brush 40 is attached to shaft 80, filaments 122 extend generally radially from shaft 80.

Referring now to FIG. 4a, an end view of brush 40 is shown. The height of brush 40, shown as dimension A, is 0.200 inches (5.08 mm). The height of housing channel 120, shown as dimension B, is 0.080 inches (2.03 mm).

Referring now to FIG. 4b, a side view of brush 40 is shown. The length of brush 40, shown as dimension C, is 0.300 inches (7.62 mm).

Referring now to FIG. 4c, a top view of housing channel 120 is shown. The width of brush 40, shown as dimension D, is 0.105 inches (2.67 mm). The width of the channel in housing channel 120, shown as dimension E, is 0.06 inches (1.5 mm).

While the best modes for carrying out the invention have been described in detail, other possibilities exist within the spirit and scope of the present invention. In the best mode, two brush assemblies with one brush each is described. More or fewer brush assemblies may be used, and each assembly may have more than one brush. Other materials, such as felt, may be used in place of the brushes. Also, the best mode describes a cleaning cartridge based on a standard 3480 form factor. The present invention may be adapted to a variety of other audio, video, and computer tape formats. Further, other means of rotating the scrubbing brush are possible. Additionally, different materials may be used to implement the cleaning cartridge. Those familiar with the art to which this invention relates will recognize various alternative designs and embodiments for practicing the invention as defined by the following claims.

What is claimed is:

1. A system for accessing magnetic tape in a tape deck comprising:

a recording head operative to read from or write to tape moving across the recording head, the recording head operative to oscillate back and forth in a first direction; and a cartridge for cleaning the recording head, the cartridge having a housing and having at least one brush assembly rotatively mounted about a fixed axis within the housing, the cartridge having at least one gear within the housing for transferring rotation from a driving hub or the cartridge to each brush assembly, wherein when the cartridge is inserted in the tape deck and the driving hub is rotated, the recording head oscillates back and forth in a first direction and the at least one brush assembly rotates about the fixed axis which is substantially orthogonal to the first direction.

2. The system for accessing magnetic tape in a tape deck recited in claim 1, wherein the at least one brush assembly comprises:

a brush;

a shaft about which the brush rotates; and a means for attaching the brush to the shaft.

3. The system for accessing magnetic tape in a tape deck as recited in claim 2, wherein the at least one brush assembly comprises:

a housing channel attached to the means for attaching the brush to the shaft; and a plurality of filaments attached to the housing channel so as to extend generally radially from the shaft.

4. The system for accessing magnetic tape in a tape deck as in claim 3, wherein the filaments are nylon with carbon suffused into the surface.

5. A method for cleaning a recording head of a magnetic tape cassette player with a cleaning cartridge, the method comprising the steps of:

providing at least one rotating brush assembly rotatively mounted within a housing of a cleaning cartridge;

providing a recording head operative to read from or write to a storage medium; and oscillating the recording head while rotating the at least one brush assembly about a fixed axis wherein the step of oscillating the recording head includes oscillating the recording head back and forth in a first direction while the at least one brush assembly is rotated about a fixed axis substantially orthogonal to the first direction.

* * * * *